United States Patent [19]

Chavanaz et al.

[11] Patent Number: 5,628,241
[45] Date of Patent: May 13, 1997

[54] INDUCTION HEATING DEVICE FOR MEAL TRAYS

[75] Inventors: Jean-Pierre Chavanaz, Doussard; Laurent Losserand, Ugine, both of France

[73] Assignee: Societe Cooperative de Production Bourgeois, Faverges, France

[21] Appl. No.: 692,137

[22] Filed: Aug. 5, 1996

[30] Foreign Application Priority Data

Aug. 3, 1995 [FR] France .................... 95 09702

[51] Int. Cl.[6] .................... A47J 39/02; A47B 31/02; H05B 6/12; H05B 6/02
[52] U.S. Cl. .................... 99/331; 99/448; 99/451; 99/468; 99/483; 99/DIG. 14; 165/64; 165/919; 219/386; 219/506; 219/521
[58] Field of Search .................... 99/330, 331–333, 99/342, 370, 403, 448, 451, 468, 470, 516, 517, DIG. 14; 165/64, 201, 267, 918, 919; 219/386, 387, 626, 662–664, 665, 506, 521, 453, 502; 374/141, 149, 150, 162; 392/449, 459

[56] References Cited

U.S. PATENT DOCUMENTS

| | | |
|---|---|---|
| 4,115,677 | 9/1978 | Yamamura et al. . |
| 4,316,078 | 2/1982 | Mack et al. ................ 99/327 X |
| 4,323,110 | 4/1982 | Rubbright et al. ............ 165/64 X |
| 4,686,340 | 8/1987 | Fukasawa ................ 219/664 X |
| 4,881,590 | 11/1989 | Meier . |
| 5,144,112 | 9/1992 | Wyatt et al. ................ 219/386 |
| 5,189,281 | 2/1993 | Wyatt et al. ................ 219/506 X |
| 5,243,171 | 9/1993 | Wood et al. ................ 99/331 |
| 5,273,360 | 12/1993 | Wyatt et al. ................ 99/448 X |
| 5,274,216 | 12/1993 | DeGrow et al. ................ 219/386 |
| 5,285,051 | 2/1994 | DeGrow et al. ................ 165/919 |
| 5,403,997 | 4/1995 | Wimpee et al. ................ 165/919 X |
| 5,424,514 | 6/1995 | Lee ................ 219/665 X |
| 5,454,427 | 10/1995 | Westbrooks, Jr. et al. ........ 99/331 |
| 5,539,185 | 7/1996 | Polster ................ 99/330 X |

FOREIGN PATENT DOCUMENTS

| | | |
|---|---|---|
| 0285552 | 10/1988 | European Pat. Off. . |
| 2657486 | 7/1991 | France . |
| 2711088 | 9/1978 | Germany . |
| 3612707 | 10/1986 | Germany . |
| 3610196 | 10/1987 | Germany . |
| 4428353 | 2/1995 | Germany . |
| 91/02478 | 3/1991 | WIPO . |

*Primary Examiner*—Timothy F. Simone
*Attorney, Agent, or Firm*—Ratner & Prestia

[57] ABSTRACT

A device for induction heating of meal trays includes an arrangement for supporting a series of trays one above the other. The foods to be heated are placed on a part of the tray that may include a layer of material that can be heated by magnetic induction and under an insulative dish-cover covered on the inside with a layer of material that can be heated by magnetic induction. Induction shelves are inserted between the trays and comprise groups of induction coils. The groups of induction coils are energized separately with high-frequency electrical energy by a multiplexed electrical generator. A detector detects the presence or the absence of the dish-covers. A control unit disables the energization of groups of induction coils near an area in which there is no dish-cover. The device adapts automatically to the presence or the absence of trays and/or dish-covers, optimizing efficiency and minimizing the generation of electromagnetic interference.

10 Claims, 5 Drawing Sheets

INDUCTION HEATING DEVICE FOR MEAL TRAYS

BACKGROUND OF THE INVENTION

1. Field of the Invention

The present invention concerns devices for heating foods on meal trays, in particular for distribution of meals in collectivities, company canteens, hospitals.

2. Description of the Prior Art

Devices of this kind for heating foods are described, for example, in document DE-A-27 11 088, comprising means for supporting a series of trays one above the other with an appropriate distance between them and a series of induction shelves containing induction coils connected to a high-frequency current generator to generate a high-frequency alternating magnetic field, the induction shelves being inserted between the successive trays in a heating area of the trays.

The foods to be heated are placed on plastics materials plates the top surface of which is covered with a thin aluminum bowl, the plates being covered by a removable insulative lid the bottom face of which is covered by a metal film.

The induction coils carrying a high-frequency electric field generate a high-frequency alternating magnetic field in the tray heating area which heats by induction the bottom metal layer covering the plate and the removable top metal layer covering the inside of the lid.

In an induction heating device of this kind the system comprising the induction coils and the top and bottom metal layers carried by the trays form a magnetic circuit the impedance of which differs according to whether trays are present near the coils or some trays are absent or do not carry any metal part. This difference in the impedance modifies the operation of the high-frequency electrical current generator that energizes all of the coils with the result that it is not possible to obtain optimal operation in all cases, i.e. with all the trays present and with at least some of the trays absent. This also causes variation in the rate of heating of the foods, depending on the number of trays present in the series of trays.

Furthermore, with some trays absent, the induction coils generate an interference magnetic field that propagates into the environment of the device. Thus a device of this kind causes electromagnetic interference.

The problem to which the present invention is addressed is that of designing a new method and a device for automatically preventing variation in the rate of heating of the foods when at least some of the trays of the series of trays to be heated are absent.

At the same time, the aim is to avoid the generation of electromagnetic interference, in particular when some trays are absent.

A subsidiary aim is to automate the heating of some trays and the absence of heating of other trays when the user requires this.

Finally, the device may be adapted to produce a lower temperature in a cold part of the tray on which are placed foods that must be served at a lower consumption temperature.

SUMMARY OF THE INVENTION

To achieve the above and other objects, a device for heating foods placed on meal trays comprises, in accordance with the invention:

means for supporting a series of trays one above the other with an appropriate distance between them, the foods to be heated being placed on a tray heating area on a respective tray, a plurality of induction generators each containing at least one group of induction coils connected to a high-frequency electrical current generator and disposed near said tray heating area of successive trays to produce a high-frequency alternating magnetic field heating members of material that can be heated by magnetic induction placed near said foods, said groups of induction coils of each induction generator being energized with high-frequency electrical power separately from said groups of induction coils of the other induction generators, detector means associated with at least some groups of controlled induction coils of induction generators to detect the presence or the absence of a corresponding adjacent member of material that can be heated by magnetic induction, and control and switching means that automatically disable the energization of groups of induction coils for which said detector means have detected the absence of a corresponding adjacent member of material that can be heated by magnetic induction.

In one advantageous embodiment, the detector means comprise means for measuring and comparing a current flowing from the electrical generator into each group of controlled induction coils, adapted to generate a "present" signal when the current is in a first range of current values that are normal in the presence of the corresponding adjacent member of material that can be heated by magnetic induction and to generate an "absent" signal when said current is in a second range of current values that are normal in the absence of a corresponding adjacent member of material that can be heated by magnetic induction.

A multiplexing device is preferably electrically inserted between the groups of induction coils and one or more high-frequency electrical current generators, the multiplexing device being adapted to energize the groups of induction coils separately and in sequence to maintain a substantially constant load on each electrical generator regardless of the number of induction coils to be energized.

The control means are advantageously adapted to disable the energization of some groups of induction coils selected by the user.

In a first embodiment:

said induction generators comprise at least groups of bottom induction coils associated with members that conduct magnetic field disposed above said bottom induction coils, said groups of controlled induction coils are the groups of bottom induction coils, and the foods to be heated on each tray are placed under a removable top layer of material that can be heated by magnetic induction.

The removable top layers of material that can be heated by magnetic induction are advantageously disposed on the inside of insulative material dish-covers covering the tray heating area.

In a second embodiment:

said induction generators comprise groups of top induction coils associated with members that conduct magnetic field disposed under said top induction coils, and each tray includes in its heating area a member of material that can be heated by magnetic induction.

The two embodiments can be combined by providing induction generators simultaneously incorporating bottom induction coils and top induction coils and members of a material that can be heated by magnetic induction placed both in the trays and in the dish-covers.

Other objects, features and advantages of the present invention will emerge from the following description of a particular embodiment given with reference to the appended drawings.

DETAILED DESCRIPTION OF THE PREFERRED EMBODIMENT

Figure 1:
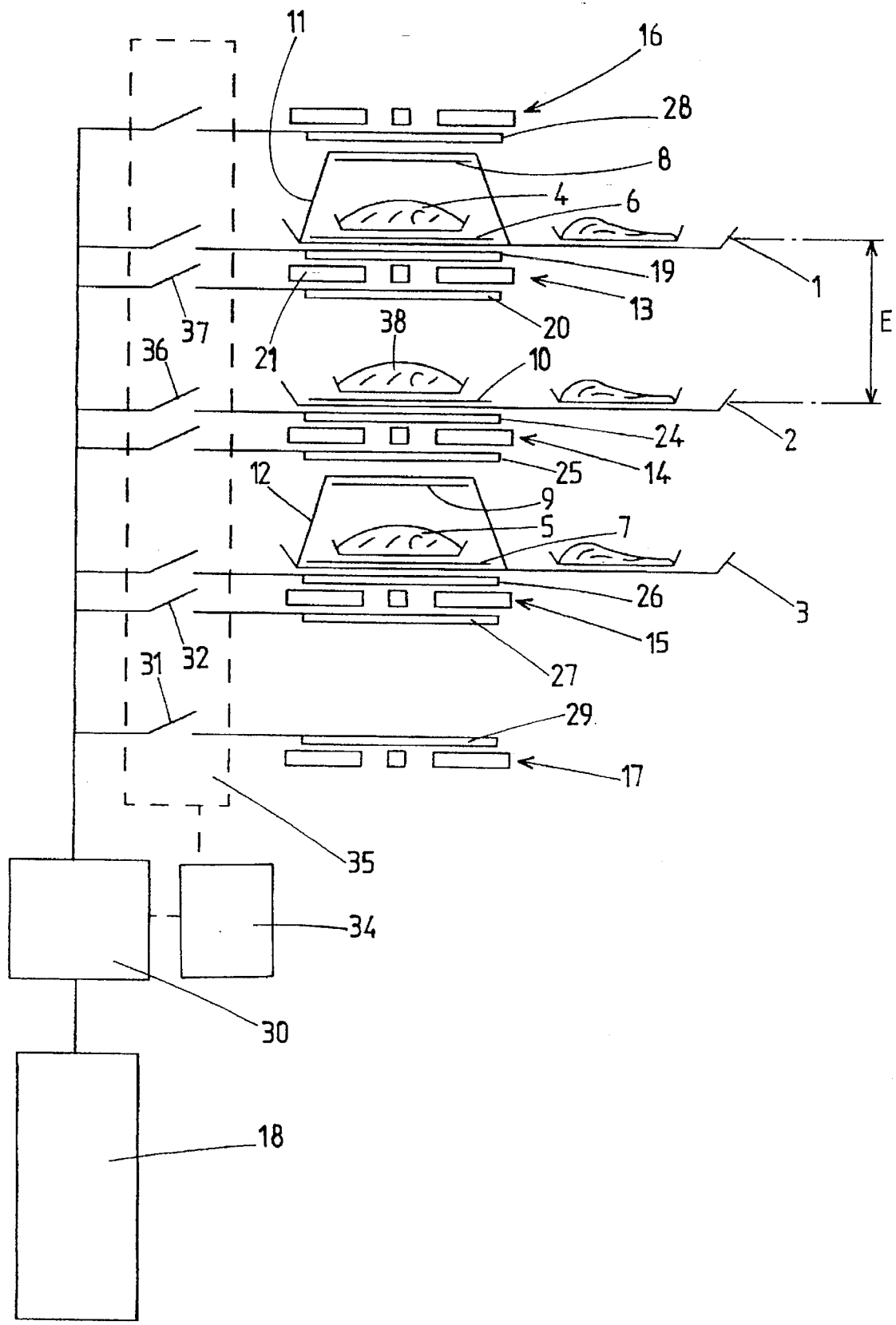
FIG. 1 is a diagrammatic view of one embodiment of an induction heating device of the present invention for heating meal trays.

In the embodiment shown in FIG. 1 the food heating device of the invention heats food placed on meal trays 1, 2 and 3. The trays 1, 2 and 3 are held by means enabling them to be supported one above the other with an appropriate distance E between them.

The foods 4 and 5 to be heated are placed on a heating area of the corresponding trays 1 and 3, in the letfhand part of FIG. 1, between a bottom layer 6 or 7 of material that can be heated by magnetic induction and a removable top layer 8 or 9 of material that can be heated by magnetic induction.

The material that can be heated by magnetic induction can be selected from the materials usually employed for heating by magnetic induction, having an appropriate magnetic susceptibility and an appropriate electrical resistivity.

In the embodiment shown, each bottom layer 6 or 7 of material that can be heated by magnetic induction is placed on top of or incorporated in the structure of the tray heating area of the corresponding trays 1 and 3. Note that the intermediate tray 2 also includes a bottom layer 10 of material that can be heated by magnetic induction placed on top of the tray or incorporated into the structure of the tray.

The removable top layers 8 and 9 of material that can be heated by magnetic induction are on the inside of respective insulative material dish-covers 11 and 12 covering the heating area of the corresponding trays 1 and 3. The tray 2 has no dish-cover.

Intermediate induction generators 13, 14 and 15 in the general shape of shelves are inserted between the tray heating areas of the successive trays. Likewise, end induction generators 16 and 17 in the general shape of shelves are inserted at the ends of the stack of trays.

The induction generators 13, 14, 15, 16 and 17 contain groups of induction coils connected to one or more high-frequency electric current generators 18 to produce a high-frequency alternating magnetic field that heats the bottom layers 6 and 7 and/or top layers 8 and 9 of material that can be heated by magnetic induction, said bottom and/or top layers heating the foods 4 and 5 near them by conduction.

The induction coils can be of a design known in itself in magnetic induction heating devices, for example a flat spiral conductor wound around a vertical axis.

The distance E between the trays such as the trays 1 and 2 is chosen so that the bottom layers 6 and 7 of material that can be heated by magnetic induction are near the corresponding intermediate induction generators 13 and 15 which are underneath them and/or the top layers 8 and 9 of material that can be heated by magnetic induction are near the respective induction generators 16 and 14 that are above them.

Figure 2:
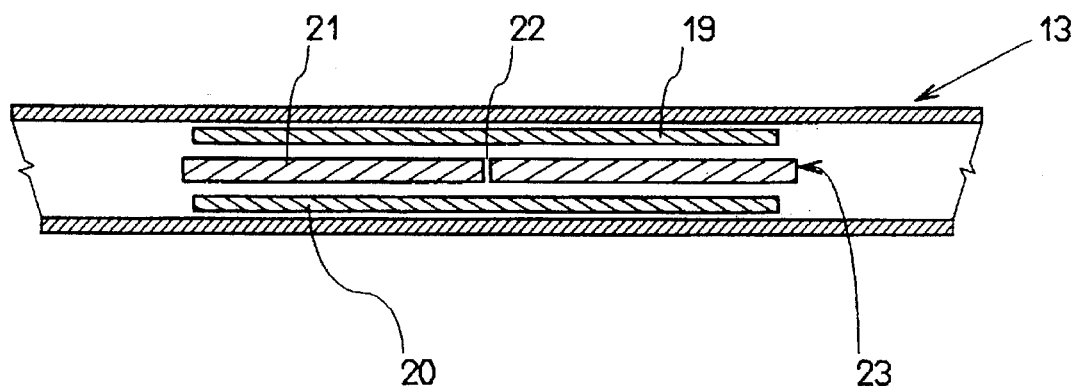
FIG. 2 is a partial side view in section showing the structure of an induction generator in the form of a shelf of the FIG. 1 embodiment.

As shown in FIGS. 1 and 2, in the intermediate induction generators such as the induction generator 13 the induction coils 19 and 20 are disposed in groups of vertically staggered induction coils comprising at least one group of top induction coils 19 and at least one group of bottom induction coils 20.

Figure 3:
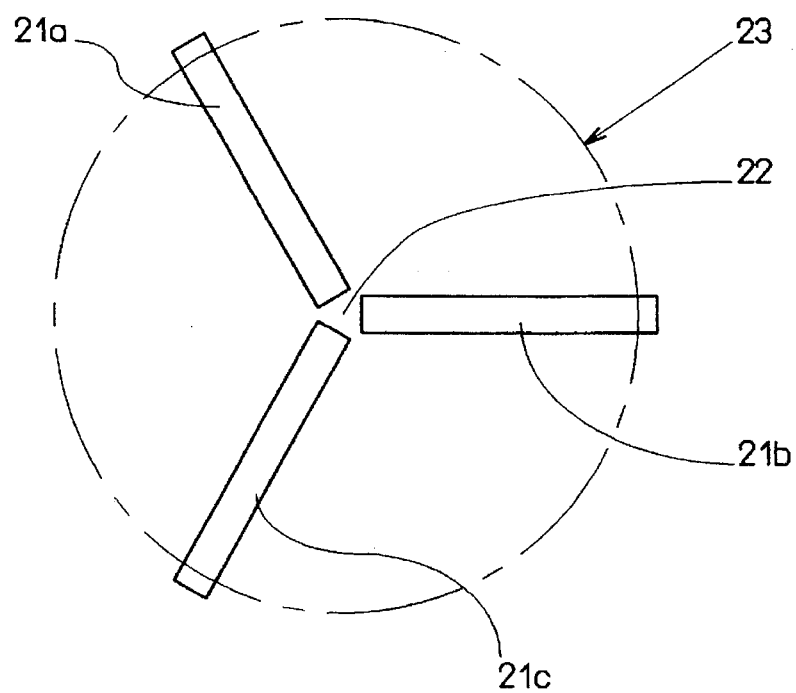
FIG. 3 is a top view of a coil from FIG. 2.
Figure 4:
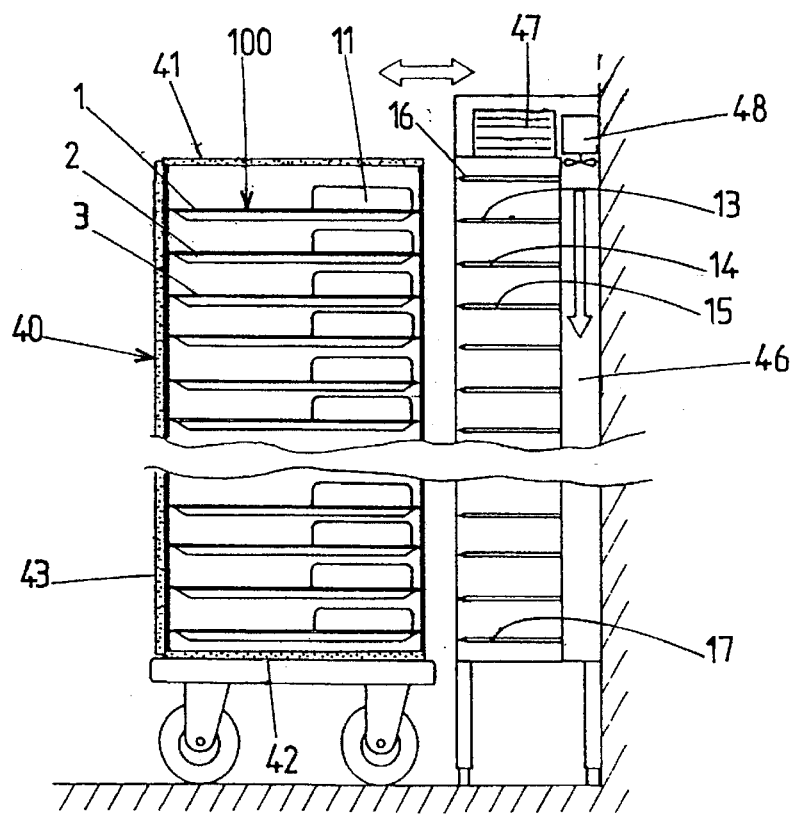
FIG. 4 is a side view in section of a trolley-cabinet embodiment of heating device of the invention.
Figure 5:
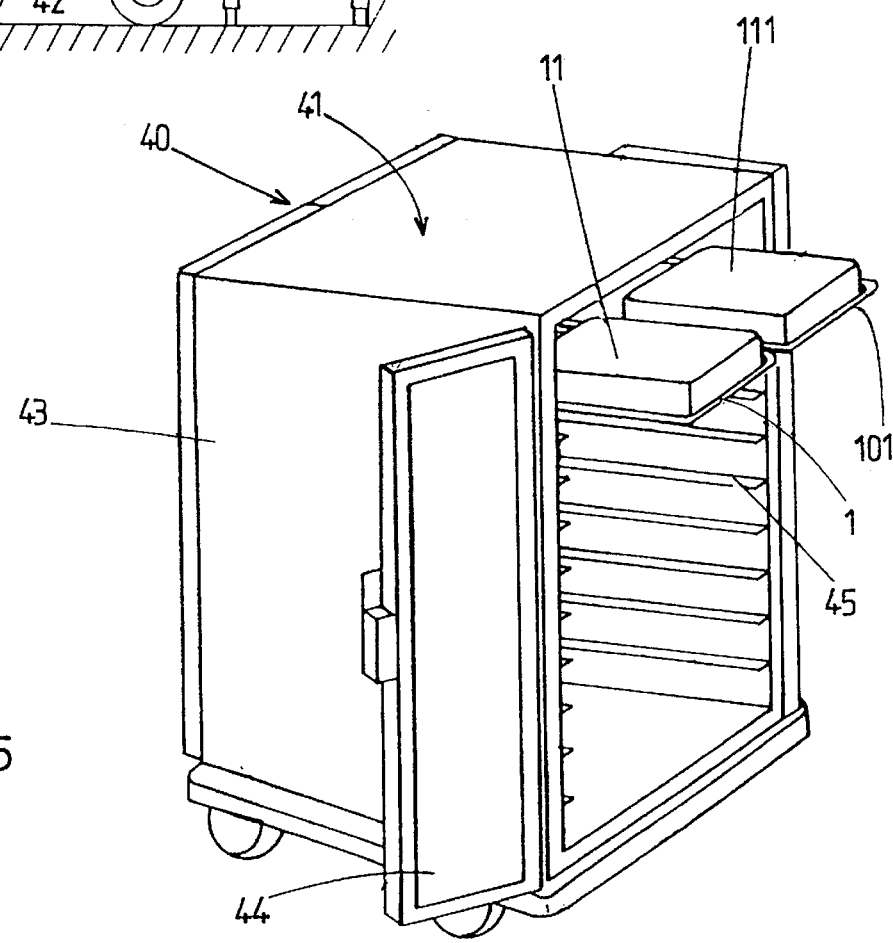
FIG. 5 is a perspective view of the trolley from FIG. 4.
Figure 6:
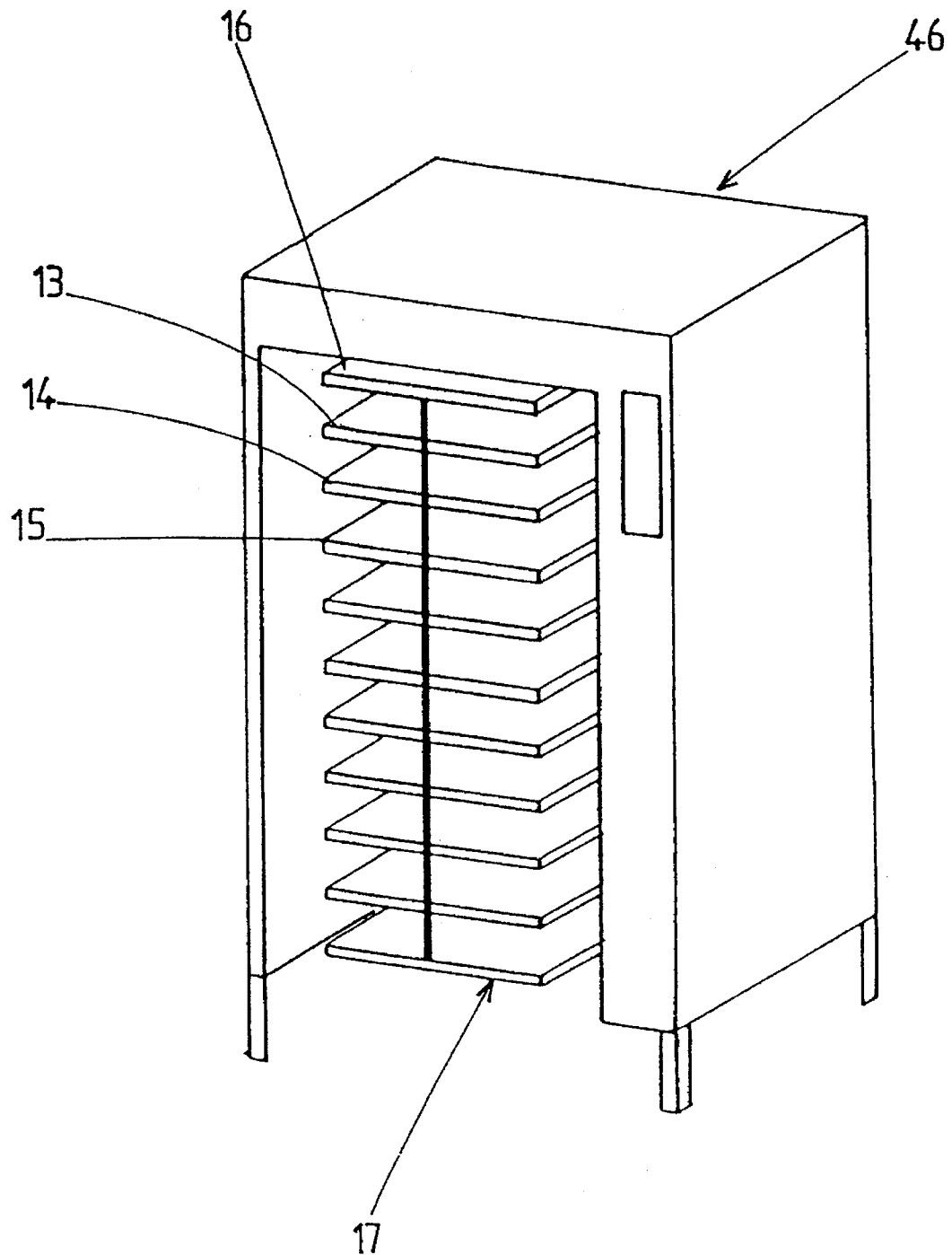
FIG. 6 is a perspective view of the cabinet from FIG. 4.
Figure 7:
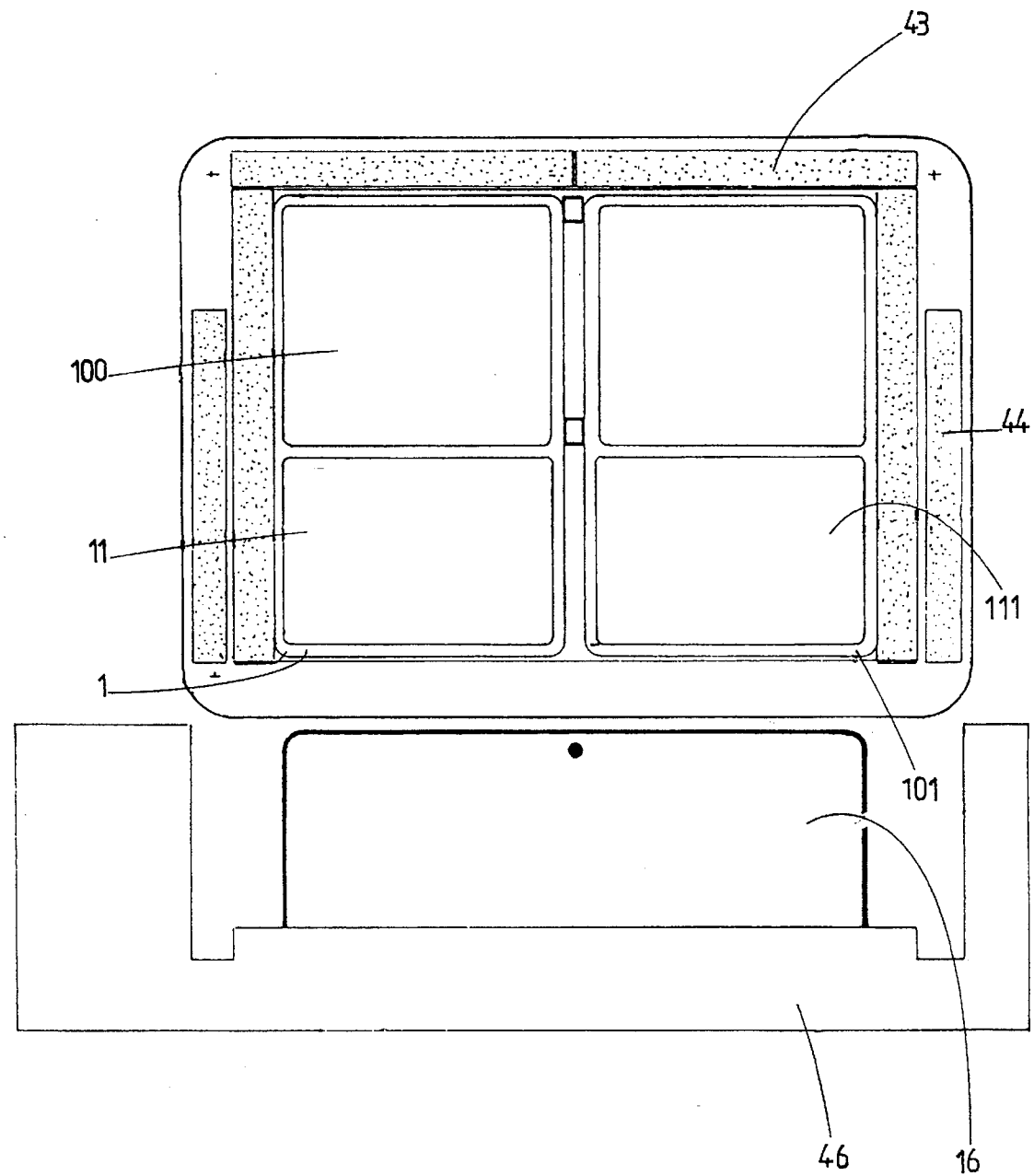
FIG. 7 is a plan view in section of the trolley-cabinet combination from FIG. 4.

The groups of induction coils 19 and 20 of each intermediate induction generator are separated by intermediate members 21 that conduct magnetic field, adapted to deflect the magnetic field radially between the groups of top and bottom induction coils 19 and 20, respectively. In the embodiment shown in FIG. 3, the intermediate members 21 that conduct magnetic field comprise at least three ferrite rods 21a, 21b and 21c radiating from the center 22 of the induction coils 19 or 20 to their periphery 23. Other geometries of the members that conduct magnetic field may be used.

In the embodiment shown in FIG. 1 the intermediate induction generator 13 therefore comprises the top and bottom groups of induction coils 19 and 20, respectively, the intermediate induction generator 14 comprises two groups of top and bottom induction coils 24 and 25, respectively, the intermediate induction generator 15 comprises two groups of top and bottom induction coils 26 and 27, respectively, the top induction generator 16 comprises only one group of bottom induction coils 28, and the bottom induction generator 17 comprises only one group of top induction coils 29. It will be understood that the drawing shows by way of example only one coil per group of coils and that each induction coil may be replaced by a group of coils offset laterally and distributed in the corresponding shelf to heat a larger area.

The intermediate members 21 that conduct magnetic field increase the efficiency of each induction coil by closing the magnetic field between the induction coil and the corresponding layer of material that can be heated by magnetic induction and magnetically decouple the induction coils of the group of top induction coils 19 from the induction coils of the group of bottom induction coils 20 of each intermediate induction generator such as the induction generator 13. Accordingly, the magnetic field generated by the groups of bottom induction coils 20 is made substantially independent of the magnetic field generated by the groups of top induction coils, and vice versa. Additionally, the apparent electrical impedance at the terminals of a group of induction coils is substantially independent of the presence or the absence of a tray or of a dish-cover facing the other group of induction coils of the same induction generator and substantially independent of the energization or non-energization of the other group of induction coils of the same induction generator.

In the embodiment shown in FIG. 1 the groups of induction coils of each induction generator 13 to 16 are energized with high-frequency electrical energy separately, from one or more high-frequency electrical generators such as the electrical generator 18 via a switching device 35 associated with control means 34.

In accordance with one advantageous feature, the control means 34 control the switching device 35 in such a way as to constitute a multiplexing device inserted into the electrical circuit between the groups of induction coils and the high-frequency electrical current generator(s) 18. The multiplexing device, consisting of the control means 34 and switching device 35, is adapted to energize the groups of induction coils separately and in sequence, so maintaining a substantially constant load on the electrical generator 18, regardless of the number of groups of coils to be energized. This ensures that the electrical generator 18 works at all times under the best possible conditions of load and efficiency.

The electrical power can be switched to a given group of coils for one second, for example, after which the energy is switched to the next group of coils, then to a further group of coils, and so on.

When a relatively large number of trays is present, a plurality of electrical generators like the electrical generator 18 may be used.

Another possibility is for the group of bottom induction coils such as the group of induction coils 20 of one induction generator and the group of top induction coils such as the group of induction coils 24 of the adjacent induction generator 14 to be energized at the same time.

In the embodiment shown, detector means 30 are inserted between the electrical generator 18 and the switching device 35 to detect the presence or the absence of a corresponding adjacent member of material that can be heated by magnetic induction, such as the top layer 8 for the group of induction coils 28, the top layer 9 for the group of induction coils 25 and the bottom layers 6, 7 and 10 for the groups of induction coils 19, 26 and 24.

In an advantageous embodiment the detector means 30 comprise means for measuring and comparing the current flowing from the electrical generator 18 into each group of controlled induction coils and adapted to generate a "present" signal when the current is in a first range of current values that are normal in the presence of a corresponding adjacent member of material that can be heated by magnetic induction and to generate an "absent" signal when the current is in a second range of current values that are normal in the absence of a corresponding adjacent member of material that can be heated by magnetic induction. A fault signal can be generated in the event of a fault in a group of coils. The person skilled in the art can easily measure the corresponding normal current in the presence and in the absence of a dish-cover or a tray and deduce the corresponding current threshold for producing the "present" and "absent" signals sent to the control means 34.

During a preliminary stage of operations the groups of induction coils are energized briefly one by one, one after the other. The detector means 30 generate the corresponding "present" or "absent" signals and these signals are sent to the control means 34 which include appropriate memories, a microprocessor or a microcontroller adapted to process the signals and an appropriate first program sequence. This first program sequence generates the signals controlling the switching device 35 to multiplex the energization of the groups of coils and stores the "present" and "absent" signals from the detector means 30 in the appropriate memories, associating them with the corresponding groups of coils.

For example, in FIG. 1 there is no tray between the induction generator 15 and the induction generator 17 and as a result the detector means 30 detect that there is no top member of material that can be heated by magnetic induction near the group of coils 29 of the induction generator 17 and the group of bottom coils 27 of the induction generator 15, and generates the corresponding "absent" signal.

Likewise, there is no dish-cover on the intermediate tray 2. As a result the detector means 30 detect that there is no top member of material that can be heated by magnetic induction near the group of bottom induction coils 20 and generates a corresponding "absent" signal.

On the other hand, the layers 8, 6, 10, 9 and 7 of material that can be heated by magnetic induction are adjacent the respective groups of induction coils 28, 19, 24, 25 and 26 with the result that the detector means 30 generate corresponding "present" signals.

The control means 34 include a second program sequence for determining the groups of coils that muse be energized in the subsequent heating step according to the presence or the absence of trays and/or dish-covers. This second program sequence can advantageously generate signals stored in memory that can be used to inhibit the subsequent energization of groups of coils immediately above and below an area in which there is no removable top layer of material that can be heated by magnetic induction.

The control means 34 comprise a third program sequence for generating the control signals of the switching device 35 in accordance with said signals stored in memory during the subsequent heating step. During this step, the switches 31, 32, 36 and 37 remain open in the FIG. 1 example. As a result, the foods 38 in the tray heating area of the tray 2 are not heated, the bottom layer 10 of material that can be heated by magnetic induction not being subject to any magnetic induction produced by the adjacent group 24 of induction coils that are not energized. Likewise, the groups of induction coils 20, 27 and 29 are not energized.

It will be understood that the device can detect automatically the presence or the absence of a tray, for example the absence of the tray between the shelves 15 and 17.

Additionally, or alternatively, the device can detect the absence of a dish-cover on a tray such as the intermediate tray 2 and deduce that the food carried by that tray must not be heated.

As a result, the device adapts automatically to the requirements of the user, who can load a varying number of trays and who can very easily command heating or non-heating of selected trays by placing a dish-cover or not placing a dish-cover over the heating area of the selected tray(s).

In accordance with one advantageous possibility, during the subsequent heating step, the detector means 30 and the control means 34 verify continuously that the current flowing into each group of induction coils remains with an acceptable range of values. If the current value diverges from this range, the control means 34 can generate an alarm signal.

In the advantageous embodiment shown in FIGS. 4 through 7, the heating device of the invention is adapted specifically for the distribution of meal trays in collectivities such as hospitals.

In this case the means for supporting the series of trays comprise a mobile trolley 40 for transporting the trays 1, 2 and 3, the trolley being enclosed by a top wall 41, a bottom wall 42 and a peripheral wall 43 incorporating at least one front door 44. The trolley 40 may, for example, accommodate two trays side by side on each level, such as the trays 1 and 101, which can carry dish-covers such as the dish-covers 11 and 111. The trays are mounted on slides 45 so that they can be slid out longitudinally to serve the meals. In a coupled heating position, the trolley 40 is placed against a fixed cabinet 46, open at the front, and carrying the induction generators such as the induction generators 16, 13, 14, 15 and 17 in the shape of shelves. The fixed cabinet 46 is adapted to receive the open front face of the trolley 40. In the coupled position the successive induction generators 13–17 of the cabinet 46 are inserted into the trolley 40, between the heating areas of the trays.

In the embodiment shown the trays such as the tray 1 each have a heating area covered by a dish-cover such as the dish-cover 11 and a cool area such as the area 100 at a distance from the open front face of the trolley 40. The cabinet 46 includes a cool air generator 47 and air circulation means 48 for circulating cool air in the trolley 40 to direct cool air onto the cool area 100 of the trays such as the tray 1.

A simplified embodiment provides in each induction generator only groups of bottom induction coils for induction heating of members of material that can be heated by magnetic induction placed in the dish-covers covering the food.

The induction generators may equally include groups of coplanar coils in the shape of shelves, as shown, and/or coils distributed laterally at the periphery of three sides of the area occupied by the dish-covers covering the food.

The present invention is not limited to the embodiments explicitly described but includes the various variants and generalizations thereof within the scope of the following claims.

We claim:

1. A device for heating foods placed on meal trays, comprising:

means for supporting a series of trays one above the other with an appropriate distance between them, foods to be heated being placed on a tray heating area on a respective tray, a plurality of induction generators each containing at least one group of induction coils connected to a high-frequency electrical current generator and disposed near said tray heating area of successive trays to produce a high-frequency alternating magnetic field heating members of material that can be heated by magnetic induction placed near said foods, said groups of induction coils of each induction generator being energized with high-frequency electrical power separately from said groups of induction coils of the other induction generators, detector means associated with at least some groups of controlled induction coils of induction generators to detect the presence or the absence of a corresponding adjacent member of material that can be heated by magnetic induction, and control and switching means that automatically disable the energization of groups of induction coils for which said detector means have detected the absence of a corresponding adjacent member of material that can be heated by magnetic induction.

2. The device as claimed in claim 1 wherein said detector means comprise means for measuring and comparing a current flowing from said electrical generator into each group of controlled induction coils, adapted to generate a "present" signal when said current is in a first range of current values that are normal in the presence of the corresponding adjacent member of material that can be heated by magnetic induction and to generate an "absent" signal when said current is in a second range of current values that are normal in the absence of a corresponding adjacent member of material that can be heated by magnetic induction.

3. The device as claimed in claim 1 wherein a multiplexing device is electrically inserted between said groups of induction coils and one or more high-frequency electrical current generators, said multiplexing device being adapted to energize said groups of induction coils separately and in sequence to maintain a substantially constant load on each electrical generator regardless of the number of induction coils to be energized.

4. The device as claimed in claim 1 wherein said control means are adapted to disable the energization of some groups of induction coils selected by the user.

5. The device as claimed in claim 1 wherein:

said induction generators comprise at least groups of bottom induction coils associated with members that conduct magnetic field disposed above said bottom induction coils, said groups of controlled induction coils are said groups of bottom induction coils, and the foods to be heated on each tray are placed under a removable top layer of material that can be heated by magnetic induction.

6. The device as claimed in claim 5 wherein said removable top layers of material that can be heated by magnetic induction are disposed on the inside of insulative material dish-covers covering said tray heating area.

7. The device as claimed in claim 1 wherein:

said induction generators comprise groups of top induction coils associated with members that conduct magnetic field disposed under said top induction coils, and each tray includes in its heating area a member of material that can be heated by magnetic induction.

8. The device as claimed in claim 5 wherein said members that conduct magnetic field comprise at least three ferrite rods radiating from the center of each corresponding induction coil to its periphery.

9. The device as claimed in claim 1 wherein:

said means for supporting said series of trays comprise a mobile trolley for transporting trays closed by top and bottom walls and by a peripheral wall including at least one front door, and said induction generators are placed on a fixed cabinet adapted to receive the open front face of said trolley in a coupled position in which said tray heating areas are inserted between successive induction generators.

10. The device as claimed in claim 9 wherein:

said trays include a cool area away from said open front face of said trolley, and said fixed cabinet includes a cool air generator and means for circulating cool air in said trolley to direct said cool air onto said cool area of said trays.

* * * * *